United States Patent
Kim et al.

(10) Patent No.: US 7,826,517 B2
(45) Date of Patent: Nov. 2, 2010

(54) INTER-CARRIER INTERFERENCE CANCELLATION METHOD AND RECEIVER USING THE SAME IN A MIMO-OFDM SYSTEM

(75) Inventors: Eung-Sun Kim, Suwon-si (KR);
Jong-Hyeuk Lee, Anyang-si (KR);
Jong-Hyun Kwun, Seongnam-si (KR);
Jong-Bu Lim, Pohang-si (KR);
Gi-Hong Im, Pohang-si (KR); Chan-Ho Choi, Pohang-si (KR)

(73) Assignees: Samsung Electronics Co., Ltd., Suwon-si (KR); Postech Foundation, Pohang-si (KR)

( * ) Notice: Subject to any disclaimer, the term of this patent is extended or adjusted under 35 U.S.C. 154(b) by 870 days.

(21) Appl. No.: 11/710,856

(22) Filed: Feb. 26, 2007

(65) Prior Publication Data

US 2007/0248151 A1    Oct. 25, 2007

Related U.S. Application Data

(60) Provisional application No. 60/776,261, filed on Feb. 24, 2006.

(30) Foreign Application Priority Data

Sep. 14, 2006    (KR) ............... 10-2006-0088974

(51) Int. Cl.
H04B 1/69    (2006.01)
H04B 1/707    (2006.01)
H04B 1/713    (2006.01)

(52) U.S. Cl. .................. 375/148; 375/144; 375/346; 375/349; 375/260; 375/267; 455/500; 455/501; 455/504; 455/63.1

(58) Field of Classification Search ............... 375/148, 375/144, 346, 347, 349, 260, 267, 299; 455/500, 455/501, 504, 63.1
See application file for complete search history.

(56) References Cited

U.S. PATENT DOCUMENTS

| | | | | |
|---|---|---|---|---|
| 7,266,168 | B2 * | 9/2007 | Kwak et al. | 375/347 |
| 7,463,694 | B2 * | 12/2008 | Kwak et al. | 375/267 |
| 7,546,103 | B1 * | 6/2009 | Kopikare et al. | 455/277.1 |
| 7,643,538 | B2 * | 1/2010 | Currivan et al. | 375/144 |
| 2003/0035491 | A1 * | 2/2003 | Walton et al. | 375/267 |

* cited by examiner

Primary Examiner—Phuong Phu
(74) Attorney, Agent, or Firm—NSIP Law

(57) ABSTRACT

A receiver for ICI cancellation in a MIMO system is provided, in which a detection orderer determines a subcarrier detection order according to SINRs of subcarriers in an I-CMOS, a detector receives a vector on the subcarriers and a priori information from a decoder according to the subcarrier detection order and iteratively estimates the received vector using the a priori information, and the decoder decodes an ICI-cancelled signal according to the estimate.

21 Claims, 5 Drawing Sheets

INTER-CARRIER INTERFERENCE CANCELLATION METHOD AND RECEIVER USING THE SAME IN A MIMO-OFDM SYSTEM

PRIORITY

This application claims priority under 35 U.S.C. §119(a) to a U.S. Provisional Patent Application filed in the U.S. Patent and Trademark Office on Feb. 24, 2006 and assigned Ser. No. 60/776,261 and a Korean Patent Application filed in the Korean Intellectual Property Office on Sep. 14, 2006 and assigned Serial No. 2006-88974, the entire disclosure of each of which is hereby incorporated by reference.

BACKGROUND OF THE INVENTION

1. Field of the Invention

The present invention generally relates to an Inter-Carrier Interference (ICI) cancellation method based on Cyclic Prefix Reconstruction (CPR) and a receiver using the same in a Multiple-Input Multiple-Output (MIMO)-Orthogonal Frequency Division Multiplexing (OFDM) system. More particularly, the present invention relates to an Improved-Minimum Mean Square Error (I-MMSE) equalization method and an Improved-Capacity Mapping Ordering Scheme (I-CMOS) for reducing an ICI component during CPR, and a receiver using the same.

2. Description of the Related Art

A combination of OFDM and MIMO has attracted much interest as a technology for increasing the data rate of a frequency selective fading channel in a future-generation wireless communication system.

Since a MIMO system sends independent data streams through multiple Transmit (Tx) antennas by spatial division multiplexing, it has good capacity efficiency, compared to a Single-Input Single-Output (SISO) wireless system. Despite this advantage, the MIMO system suffers increased inter-channel interference as a capacity gain is increased.

OFDM is efficient in mitigating multipath distortion caused by the frequency selective channel. In OFDM, the frequency selective channel is converted to a set of flat fading channels for respective carriers. Hence, OFDM suppresses multipath distortion and enables high-speed transmission of a broadband signal.

The OFDM scheme adds a Cyclic Prefix (CP) before each OFDM symbol. The CP is set to be longer than a Channel Impulse Response (CIR) to thereby cancel Inter-Symbol Interference (ISI).

However, the spectral efficiency of an OFDM system decreases with the CP length. If the CP is not long enough, the ICI of a MIMO channel becomes too severe to be negligible, compared to that of a SISO channel.

Accordingly, there exists a need for a method for efficiently canceling ICI from a MIMO-OFDM channel, when a CP of an insufficient length is used.

SUMMARY OF THE INVENTION

An aspect of exemplary embodiments of the present invention is to address at least the problems and/or disadvantages described above and to provide at least the advantages described below. Accordingly, an aspect of exemplary embodiments of the present invention is to provide an ICI cancellation method and a receiver using the same, for achieving both multiplexing gain and spectral efficiency gain along with ICI cancellation by reconstructing a CP with an insufficient length in a MIMO system.

Another aspect of exemplary embodiments of the present invention is to provide a MIMO-OFDM receiver for reconstructing a CP of an insufficient length and efficiently canceling ICI by a new ordering method and an MMSE equalization method.

A further aspect of exemplary embodiments of the present invention is to provide a detection ordering method for efficiently canceling ICI using an equivalent Signal-to-Interference and Noise Ratio (SINR).

Still another aspect of exemplary embodiments of the present invention is to provide a method for calculating an estimate that minimizes a squared error with respect to a received vector according to a detection ordering method.

In accordance with an aspect of exemplary embodiments of the present invention, there is provided a receiver for ICI cancellation in a MIMO system, in which a detection orderer determines a subcarrier detection order according to SINRs of subcarriers in an I-CMOS, a detector receives a vector on the subcarriers and a priori information from a decoder according to the subcarrier detection order and iteratively estimates the received vector, and the decoder decodes an ICI-cancelled signal according to the estimate.

In accordance with another aspect of exemplary embodiments of the present invention, there is provided a method for ICI cancellation in a MIMO system, in which a subcarrier detection order is determined according to SINRs of subcarriers in an I-CMOS, a vector on the subcarriers and a priori information from a decoder are received according to the subcarrier detection order and the received vector is iteratively estimated using the a priori information, and an ICI-cancelled signal is decoded according to the estimate.

In accordance with a further aspect of exemplary embodiments of the present invention, there is provided a method for determining a detection order for ICI cancellation in a MIMO system, in which an equivalent SINR of each subcarrier is calculated for each layer, the calculated equivalent SINRs are ordered, and the detection order is determined according to the equivalent SINR ordering.

In accordance with still another aspect of exemplary embodiments of the present invention, there is provided a detection method for ICI cancellation in a MIMO system, in which a layer detection order is determined to be a descending order of equivalent SINRs based on a weight vector, an estimate of a detected layer from which a CP is removed according to the detection order is iteratively detected so that a squared error between the estimate and a received vector in the layer is minimized, the layer is decoded, the received vector is updated, the CP is cyclically reconstructed, and the detection is repeated.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Figure 1:
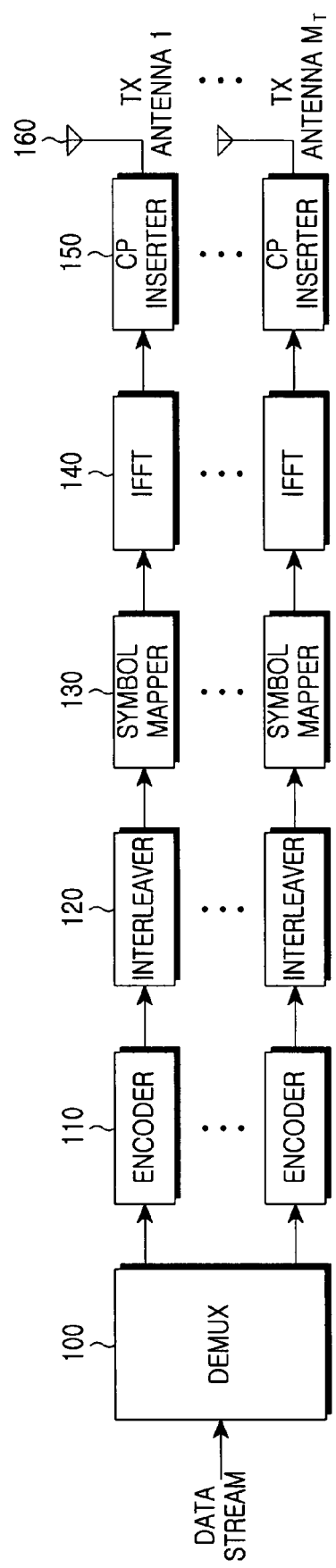
FIG. 1 is a block diagram of a transmitter in a MIMO-OFDM system according to an exemplary embodiment of the present invention.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

A general overview of the present invention will first be given below.

In an OFDM system, a CP is set to be longer than a CIR to cancel multipath interference. However, the use of the CP decreases spectral efficiency.

The use of the CP can be suppressed to increase the spectral efficiency. Accordingly, there exists a need for a method for canceling ISI using an insufficient CP. In accordance with the present invention, ICI is cancelled based on CPR in a MIMO-OFDM system.

The present invention utilizes a CPR algorithm, which was originally proposed for echo cancellation, based on tail cancellation and CPR in the MIMO-OFDM system.

However, since the MIMO system suffers from very severe ICI from multiple Tx antennas, echo cancellation and tail cancellation do not suffice for ICI mitigation. Therefore, the MIMO-OFDM system using an insufficient CP needs an efficient ICI cancellation method as well as the CPR technique.

To reduce the ICI component during CPR, a new MMSE equalizer called an I-MMSE equalizer and a new ordering method called I-CMOS are used, also taking into account ICI caused by the insufficient CP in the present invention. Consequently, a multiplexing gain and a spectral efficiency gain are simultaneously achieved.

In accordance with the present invention, a receiver uses an I-MMSE equalizer and I-CMOS. During CPR, the I-MMSE equalizer and the I-CMOS cancel ICI caused by the insufficient CP. The receiver improves overall performance by iteratively operating a CP reconstructor and a BLAST signal processor.

A. Transmitter

FIG. 1 is a block diagram of a transmitter in a MIMO-OFDM system according to an exemplary embodiment of the present invention.

Referring to FIG. 1, the transmitter includes a Demultiplexer (DEMUX) 100, encoders 110, interleavers 120, symbol mappers 130, Inverse Fast Fourier Transform (IFFT) processors 140, CP inserters 150, and Tx antennas 160.

The DEMUX 100 receives a data stream and outputs an information bit sequence $\{b_i^p\}$ to each channel encoder 110.

The encoders 110 encode the information bit sequences $\{b_i^p\}$ to bit sequences $\{c_m^p\}$ by convolutional encoding. To guarantee a terminal state for codes at the end of blocks, a feedforward encoder can be used to add an all-zero tail sequence to the blocks. The interleavers 120 block-interleave the coded bit sequences $\{c_m^p\}$. The symbol mappers 130 map the interleaved data.

The MIMO-OFDM system typically uses $M_T$ Tx antennas and $N_R$ Receive (Rx) antennas. A symbol sequence sent though a $p^{th}$ Tx antenna in an $i^{th}$ OFDM symbol period is denoted by $$\{X_{i,n}^p\}_{n=0}^{N-1}, p=1, \ldots, M_T.$$

The N-point IFFT processors 140 convert the symbol sequences $$\{X_{i,n}^p\}_{n=0}^{N-1}$$

to time-domain sequences $$\{x_{i,k}^p\}_{k=0}^{N-1}$$

by IFFT, according to Equation (1):

$$x_{i,k}^p = \frac{1}{\sqrt{N}} \sum_{n=0}^{N-1} X_{i,n}^p W_N^{-nk}, 0 \le k < N \quad (1)$$

where p=1, ..., $M_T$, k is a point value sequentially selected between 0 and N−1 in the N-point IFFT processor, and $$W_N^{nk} = e^{-j\frac{2\pi nk}{N}}.$$

The CP inserters 150 insert CPs of length G before the IFFT signals $$\{x_{i,k}^p\}_{k=0}^{N-1}.$$

The Tx antennas 160 send the resulting OFDM symbols on a channel.

The channel is modeled by an $L^{th}$-order Finite Impulse Response (FIR) filter, including Additive White Gaussian Noise (AWGN). The channel is static during at least one symbol duration.

It is assumed that the receiver gets channel information by an MMSE channel estimator. A sequence received at a $q^{th}$ Rx antenna in the $i^{th}$ OFDM symbol period is shown in Equation (2):

$$r_{i,k}^q = \begin{cases} \sum_{p=1}^{M_T} \sum_{l=0}^{G+k} h_l^{(q,p)} x_{i,(k-l)_N}^p + \sum_{p=1}^{M_T} \sum_{l=G+k+l}^{L} h_l^{(q,p)} x_{i-1,(k-l+G)_N}^p + n_{i,k}^q, & -G \leq k \leq L-G \\ \sum_{p=1}^{M_T} \sum_{l=0}^{L} h_l^{(q,p)} x_{i(k-l)_N}^p + n_{i,k}^q, & L-G \leq k \leq N \end{cases} \quad (2)$$

where $(k)_N$ is the remainder of a modulo N operation, N is the number of subcarriers, L is a CIR length, G is the CP length, $n_{i,k}^q$ is AWGN with a variance $\sigma_N^2$, and $h_l^{(q,p)}$ a CIR between the $q^{th}$ Rx antenna and the $p^{th}$ Tx antenna. In the present invention, each of the encoders 110 is a convolutional encoder with an interleaver in order to achieve the benefits of iterative equalization.

B. Receiver

Figure 2:
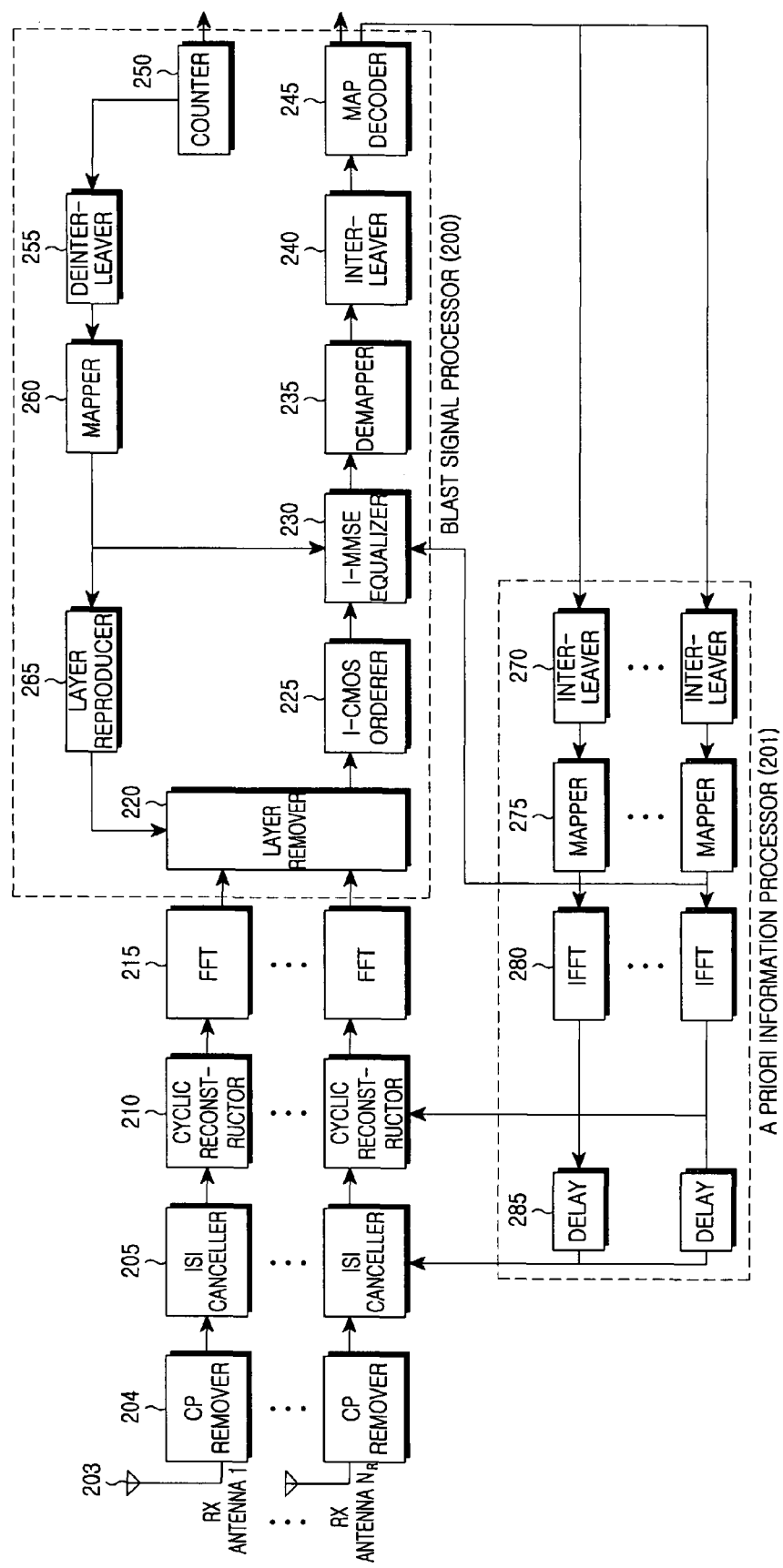
FIG. 2 is a block diagram of a receiver for ICI cancellation in the MIMO-OFDM system according to an exemplary embodiment of the present invention.

FIG. 2 is a block diagram of a receiver for ICI cancellation in the MIMO-OFDM system according to an exemplary embodiment of the present invention.

Referring to FIG. 2, the receiver includes Rx antennas 203, CP removers 204, ISI cancellers 205, CP reconstructors 210, Fast Fourier Transform (FFT) processors 215, a BLAST signal processor 200, and an a priori information processor 201. The BLAST signal processor 200 has a layer remover 220, an I-CMOS orderer 225, an I-MMSE equalizer 230, a demapper 235, an interleaver 240, a Maximum A Posteriori (MAP) decoder 245, a counter 250, a deinterleaver 255, a mapper 260, and a layer reproducer 265. The a priori information detector 201 has interleavers 270, mappers 275, IFFT processors 280, and delays 285.

The CP removers 204 eliminate CPs from signals received from the Rx antennas 203. The ISI cancellers 205 cancel ISI from the CP-free signals and the CP reconstructors 210 reconstruct the CPs.

As noted from Equation (2), if $G \geq L$, none of the samples of a sequence $$\{r_{i,k}^q\}_{k=0}^{N-1}$$

are affected by interference. On the contrary, if $G<L$, first (L–G) samples are affected by interference.

A CPR process is divided into two parts: one is tail cancellation, i.e. ISI cancellation from a current received signal using a previous symbol estimate, and the other is cyclic reconstruction. Cyclic reconstruction is a process of periodically reconstructing the current received signal using a current symbol estimate. Cyclic reconstruction is iterated along with symbol estimation. This operation is expressed as shown in Equation (3):

$$\tilde{r}_{i,k}^q = r_{i,k}^q - \sum_{p=1}^{M_T} \sum_{l=G+k+l}^{L} h_l^{(q,p)} x_{i-1,(k-l+G)_N}^p + \sum_{p=1}^{M_T} \sum_{l=G+k+l}^{L} h_l^{(q,p)} x_{i-1,(k-l)_N}^p, \quad (3)$$

$$0 \leq k \leq L-G$$

Then, the FFT processors 215 convert the reconstructed time signals to frequency signals.

Now a description will be made of CPR-based ICI cancellation in the MIMO-OFDM system with reference to FIGS. 3 and 4.

Figure 3:
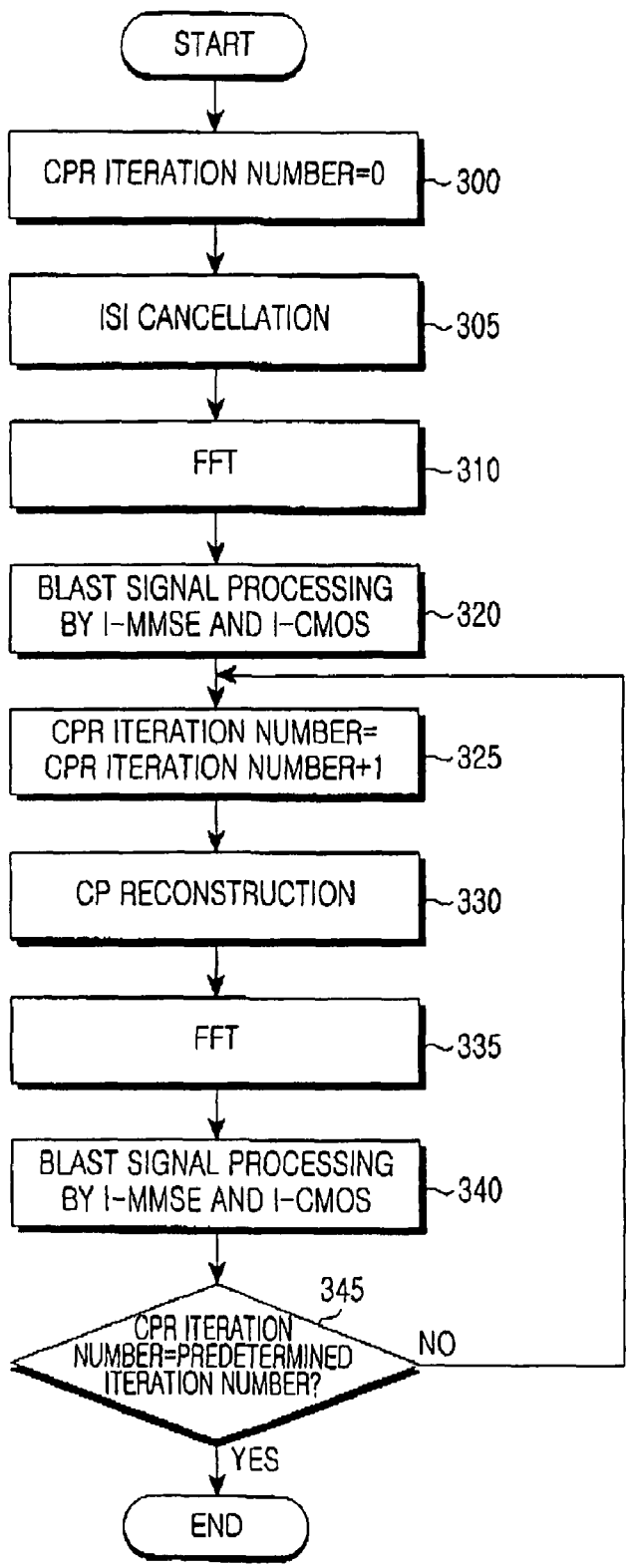
FIG. 3 is a flowchart illustrating a CPR-based ICI cancellation method in the MIMO-OFDM system according to an exemplary embodiment of the present invention.

FIG. 3 is a flowchart illustrating an iterative CPR-based ICI cancellation method according to an exemplary embodiment of the present invention.

Referring to FIG. 3, the receiver sets a CPR iteration number to an initial value 0 in step 300 and cancels ISI in step 305. The receiver FFT-processes the ISI-free signal in step 310 and performs a BLAST signal process on the FFT signal by I-MMSE and I-CMOS in step 320. In step 325, the receiver increases the CPR iteration number by 1. The receiver then reconstructs a CP cyclically in step 330. The cyclic CP reconstruction amounts to CPR. During CPR, ICI is iteratively cancelled.

In step 335, the receiver FFT-processes the signal with the cyclically reconstructed CP. The receiver performs the BLAST signal process on the FFT signal by I-MMSE and I-CMOS in step 340. Step 340 will be described in detail later with reference to FIG. 4. The receiver then compares the CPR iteration number with a predetermined iteration number in step 345. If the CPR iteration number is greater than or equal to the predetermined iteration number, the process ends. However, if the CPR iteration number is less than the predetermined iteration number, the receiver returns to step 325.

Figure 4:
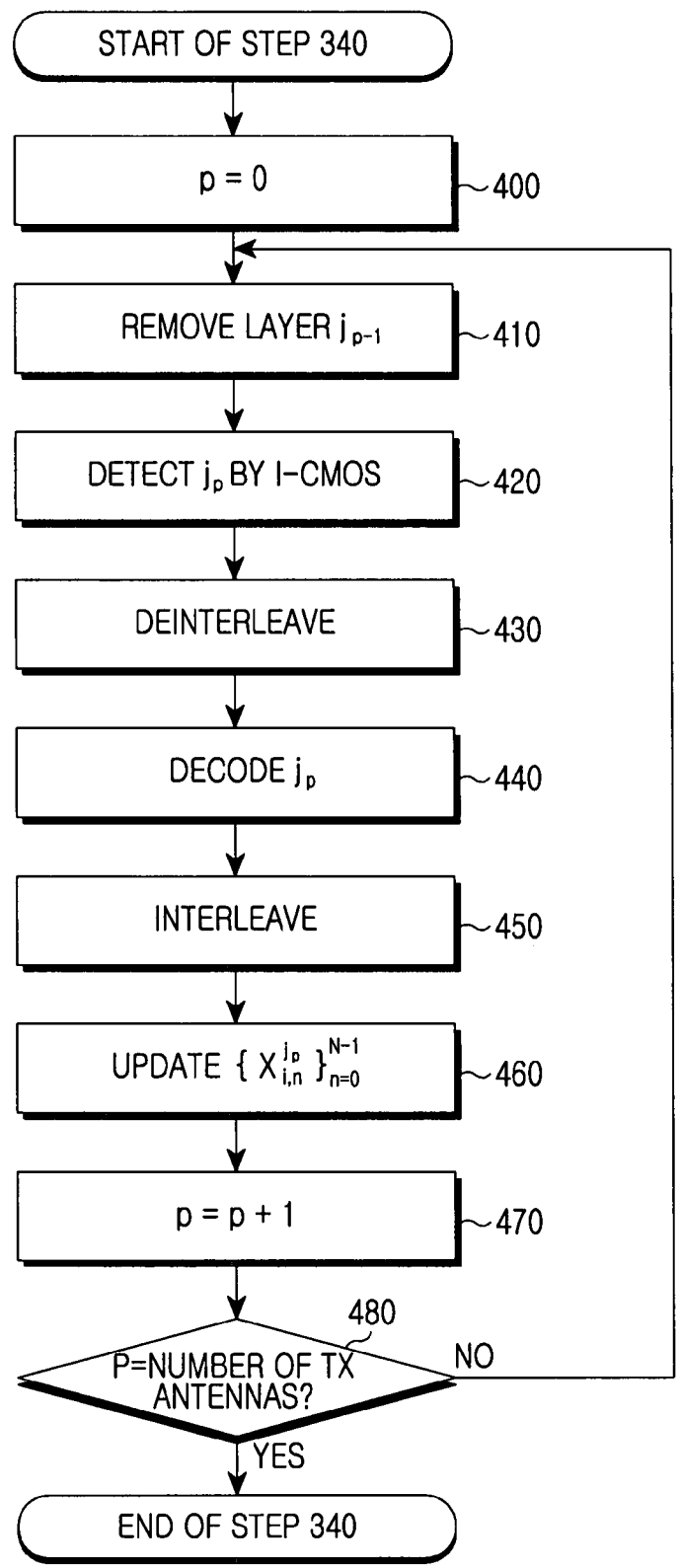
FIG. 4 is a flowchart illustrating a Bell Labs Layered Space Time (BLAST) signal process in the MIMO-OFDM system according to an exemplary embodiment of the present invention.

FIG. 4 is a flowchart illustrating the BLAST signal process of step 340 or step 320 illustrated in FIG. 3 in the MIMO-OFDM system according to an exemplary embodiment of the present invention.

Referring to FIG. 4, the receiver sets a layer number p to an initial value 0 in step 400 and eliminates a layer $j_{p-1}$ in step 410. The receiver detects a layer $j_p$ by I-CMOS in step 420 and deinterleaves the layer $j_p$ in step 430. The receiver decodes the layer $j_p$ in step 440 and interleaves the decoded layer $j_p$ in step 450. In step 460, the receiver updates $$\{X_{i,n}^p\}_{n=0}^{N-1}.$$

The receiver increases p by 1 in step 470 and compares p with the number of the Tx antennas in step 480. If p is different from the number of the Tx antennas, the receiver returns to step 410, otherwise the process ends.

A MIMO-OFDM system with an insufficient CP is affected by ICI and ISI as well as Co-Antenna Interference (CAI) from multiple Tx antennas. The present invention iteratively cancels ICI by canceling ISI and then reconstructing the CP. However, the MIMO system has a very large ICI component.

The ICI of the MIMO system cannot be sufficiently cancelled by a conventional CPR scheme used in the SISO system. To avoid this problem, the present invention takes into account ICI as well as CAI by use of the I-MMSE equalizer and the I-CMOS orderer.

Assuming that the ISI cancellation is perfect according to Equation (3), a frequency block at the $q^{th}$ Rx antenna is expressed as Equation (4):

$$\tilde{R}_i^q = FFT\{\tilde{r}_i^q\} \quad (4)$$
$$= H_{i,d}^{(q,l)} X_i^l + \Lambda + H_{i,d}^{(q,M_T)} X_i^{M_T} - H_{i,ici}^{(q,l)} X_i^l - $$
$$\Lambda - H_{i,ici}^{(q,M_T)} X_i^{M_T} + N_i^q$$

where $X_i^p$ and $\tilde{r}_i^q$ are a vector with elements $$\{X_{i,n}^p\}_{n=0}^{N-1}$$

and a vector with elements $$\{\tilde{r}_{i,k}^p\}_{k=0}^{N-1},$$

respectively.

$H_{i,d}^{(q,p)}$ is a channel matrix of a desired signal given as Equation (5) and $H_{i,ici}^{(q,p)}$ is a channel matrix of ICI expressed as Equation (6).

$$H_{i,d}^{(q,p)} = F \begin{bmatrix} h_0^{(q,p)} & 0 & \cdots & 0 & h_L^{(q,p)} & \cdots & h_1^{(q,p)} \\ \vdots & \ddots & \ddots & & \ddots & \ddots & \vdots \\ \vdots & & \ddots & \ddots & & \ddots & h_L^{(q,p)} \\ h_L^{(q,p)} & & & h_L^{(q,p)} & \ddots & & 0 \\ 0 & \ddots & & & \ddots & & \vdots \\ \vdots & \ddots & \ddots & & & \ddots & 0 \\ 0 & \cdots & 0 & h_L^{(q,p)} & \cdots & \cdots & h_0^{(q,p)} \end{bmatrix} F^{-1} \quad (5)$$

$$H_{i,ici}^{(q,p)} = F \begin{bmatrix} 0 & \cdots & 0 & h_L^{(q,p)} & \cdots & h_{G+1}^{(q,p)} & 0 & \cdots & 0 \\ \vdots & & \ddots & \ddots & \vdots & \vdots & & & \vdots \\ \vdots & & & \ddots & h_L^{(q,p)} & \vdots & & & \vdots \\ \vdots & & & & 0 & \vdots & & & \vdots \\ \vdots & & & & & \vdots & \vdots & & \vdots \\ 0 & \cdots & \cdots & \cdots & \cdots & 0 & 0 & \cdots & 0 \end{bmatrix} F^{-1} \quad (6)$$

where F is an FFT matrix. After the CP is reconstructed, a received vector on an $n^{th}$ subcarrier in an $i^{th}$ OFDM symbol $$\tilde{R}_{i,n} = [\tilde{R}_{i,n}^1 \tilde{R}_{i,n}^2 \cdots \tilde{R}_{i,n}^{N_R}]^T$$

is expressed as Equation (7):

$$\tilde{R}_{i,n} = H_{i,n} X_{i,n} - G_{i,n}(X_{i,n} - \overline{X}_{i,n}) - C_{i,n} + N_{i,n} \quad (7)$$

where $$X_{i,n} = [X_{i,n}^1 X_{i,n}^2 \cdots X_{i,n}^{M_T}]^T$$

is a transmission vector and $$\overline{R}_{i,n} = [\overline{X}_{i,n}^1 \overline{X}_{i,n}^2 \cdots \overline{X}_{i,n}^{M_T}]^T$$

is a mean vector. $H_{i,n}$, $G_{i,n}$ and $C_{i,n}$ are given as Equations (8), (9), and (10), respectively.

$$H_{i,n} = \begin{bmatrix} (H_{i,d}^{(i,l)})_{nn} & \cdots & (H_{i,d}^{(l,M_T)})_{nn} \\ \vdots & \ddots & \vdots \\ (H_{i,d}^{(N_R,1)})_{nn} & \cdots & (H_{i,d}^{(N_R,M_T)})_{nn} \end{bmatrix} \quad (8)$$

$$G_{i,n} = \begin{bmatrix} (H_{i,ici}^{(i,l)})_{nn} & \cdots & (H_{i,ici}^{(l,M_T)})_{nn} \\ \vdots & \ddots & \vdots \\ (H_{i,ici}^{(N_R,1)})_{nn} & \cdots & (H_{i,ici}^{(N_R,M_T)})_{nn} \end{bmatrix} \quad (9)$$

$$C_{i,n} = \begin{bmatrix} \sum_{p=1}^{M_T} \sum_{m=0,m\neq n}^{N-1} (H_{i,ici}^{(l,p)})_{nn} (X_{i,m}^p - \overline{X}_{i,m}^p) \\ \vdots \\ \sum_{p=0}^{M_T} \sum_{m=0,m\neq n}^{N-1} (H_{i,ici}^{(N_R,p)})_{nm} (X_{i,m}^p - \overline{X}_{i,m}^p) \end{bmatrix} \quad (10)$$

where $(\bullet)_{ij}$ represents an $i^{th}$ row and a $j^{th}$ column in a matrix.

The second and third terms $G_{i,n}(X_{i,n} - \overline{X}_{i,n})$ of Equation (7) denote an ICI component from the multiple Tx antennas. As noted from Equation (7), the simultaneous existence of the two terms increases ICI power significantly in the MIMO-OFDM system. Hence, the ICI component must be considered during MMSE equalization and ordering.

Referring back to FIG. 2, the one-tap I-MMSE equalizer 230 uses the received vector $\tilde{R}_{i,n}$ and a priori information $$\{L(X_{i,n}^p)\}_{p=1}^{M_T}.$$

It calculates an estimate of a transmitted symbol, which minimizes an MSE, $$E\{|X_{i,n}^p - \hat{X}_{i,n}^p|^2\}.$$

The a priori information processor 201 receives $$\{L(X_{i,n}^p)\}_{p=1}^{M_T} = \phi(\{L_D(c_{i,n}^p)\}_{n=0}^{N-1})$$

from the MAP decoder 245. Here, an operator $\phi$ includes the interleavers 270 and the mappers 275.

The a priori information processor 201 can acquire a mean vector $$\overline{X}_{i,n} = [\overline{X}_{i,n}^1 \overline{X}_{i,n}^2 \cdots \overline{X}_{i,n}^{M_T}]^T$$

from $$\{L(X_{i,n}^p)\}_{p=1}^{M_T}.$$

For example, in Binary Phase Shift Keying (BPSK), the mean vector is computed according to Equation (11):

$$\overline{X}_{i,n}^p = E|X_{i,n}^p| \quad (11)$$
$$= P(X_{i,n}^p = 1) - (X_{i,n}^p = -1)$$
$$= \tanh(L(X_{i,n}^p)/2).$$

A $p^{th}$ layer from which interference is cancelled by the layer remover 220 is determined according to Equation (12):

$$Y_{i,n}^p = \tilde{R}_{i,n} - H_{i,n}^p \overline{X}_{i,n}^p \quad (12)$$

where $$H_{i,n}^p$$

is a matrix resulting from eliminating a $p^{th}$ column from $H_{i,n}$ and $$\overline{X}_{i,n}^p$$

is a vector resulting from eliminating a $p^{th}$ element from $\overline{X}_{i,n}$.

By applying an orthogonal principle, a weight vector for a one-tap I-MMSE equalizer using only the first and last terms of Equation (7) is derived by Equation (13):

$$w_{i,n}^p = (H_{i,n} P_{i,n} H_{i,n}^H + \sigma_N^2 I)^{-1} h_{i,n}^p \quad (13)$$
$$P_{i,n} = Diag\{P_{i,n}^1, \ldots, P_{i,n}^{M_T}\}, P_{i,n}^q = \begin{cases} 1, & p=q \\ 1-|X_{i,n}^q|^2, & p \neq q \end{cases}$$

where $h_{i,n}^p$ is a $p^{th}$ column vector of $H_{i,n}$ and $(\bullet)^H$ represents a conjugate transpose. The weight vector described by Equation (13) is obtained with no regard to the ICI component corresponding to the second and third terms of Equation (7). This happens in the SISO system.

In the MIMO-OFDM system, an I-MMSE weight vector is calculated, taking into account all terms of Equation (7), by Equation (14):

$$w_{i,n}^p = (H_{i,n} p_{i,n} H_{i,n}^H + G_{i,n} Q_{i,n} G_{i,n}^H + G_{i,n} Q_{i,n} H_{i,n}^H + D_{i,n} + \sigma_N^1 1)^{-1} \cdot \quad (14)$$
$$(b_{i,n}^p - g_{i,n}^p(1-|\overline{X}_{i,n}^p|^2))$$

where $D_{i,n} = E\{C_{i,n} C_{i,n}^H\}$ and $Q_{i,n}$ is the same matrix as $P_{i,n}$ except $1-|\overline{X}_{i,n}^q|^2$ (for p=q). An estimate $\hat{X}_{i,n}^P$ is computed in the equalizer by Equation (15):

$$\hat{X}_{i,n}^P = (w_{i,n}^P)^H Y_{i,n}^P \quad (15)$$

Extrinsic information $L_E(X_{i,n}^P)$ is obtained using $\hat{X}_{i,n}^P$. The a priori information $$\{L(c_{i,n}^p)\}_{n=0}^{N-1} = \phi^{-1}(\{L_E(X_{i,n}^p)\}_{n=0}^{N-1})$$

is fed back to a MAP decoder of a turbo equalizer. The MAP decoder calculates extrinsic information for coded bits and extrinsic information for decoded bits. The extrinsic information $L_D(c_{i,n}^P)$ for the coded bits is used as a priori information for the one-tap I-MMSE equalizer.

A description will be made of the I-CMOS method for the MIMO-OFDM system using CPR.

BLAST uses a Successive Interference Cancellation (SIC) algorithm in the space domain. In implementing the SIC algorithm, OFDM/Horizontal-BLAST (H-BLAST) applies a CMOS in which the equivalent SINR of each layer is calculated to determine the detection order of layers. The present invention performs SIC by an I-CMOS algorithm in the BLAST signal processing. An I-CMOS algorithm suitable for MIMO-OFDM adopting CPR determines the detection order based on the I-MMSE weight vector.

To describe the I-CMOS algorithm, let Tx antennas corresponding to decoded layers be denoted by $\Psi=\{j_1, \ldots j_{p-1}\}$. The ultimate goal of the I-CMOS algorithm is to select the most suitable layer $j_p$ ($j_p \notin \Psi$) for decoding in the current stage. According to Equations (13) and (14), post SINRs of an $n^{th}$ subcarrier of layer $j_p$ are computed by Equation (16) and Equation (17):

$$SINR_{i,n}^{j_p} = \frac{\left|(w_{i,n}^{j_p})^H h_{i,n}^{j_p}\right|^2}{\sigma_N^2 \|w_{i,n}^{j_p}\|^2} \quad (16)$$

$$SINR_{i,n}^{j_p} = \frac{\left|(w_{i,n}^{j_p})^H (h_{i,n}^{j_p} - g_{i,n}^{j_p}(1-|\overline{X}_{i,n}^{j_p}|^2))\right|^2}{\sigma_{x_{i,n}^{j_p}}^2} \quad (17)$$

where $$\sigma_{\hat{x}_{i,n}^b}^2 = \mu_{\hat{x}_{i,n}^b} - \mu_{\hat{x}_{i,n}^b}^2$$

and $$\mu_{\hat{x}_{i,n}^b}^2 = (w_{i,n}^{j_p})^H (h_{i,n}^{j_p} - g_{i,n}^{j_p}(1-|X_{i,n}^{j_p}|^2)).$$

Using Equations (16) and (17), an equivalent SINR is calculated as shown in Equation (18):

$$SINR_{equiv}^{jp} = 2^{\frac{\sum_{n=0}^{N-1} \log_2(1+SINR_{i,n}^{jp})}{N}} - 1 \quad (18)$$

A layer with the highest equivalent SINR is selected as a detection layer for a $p^{th}$ stage.

C. Simulation Result

Figure 5:
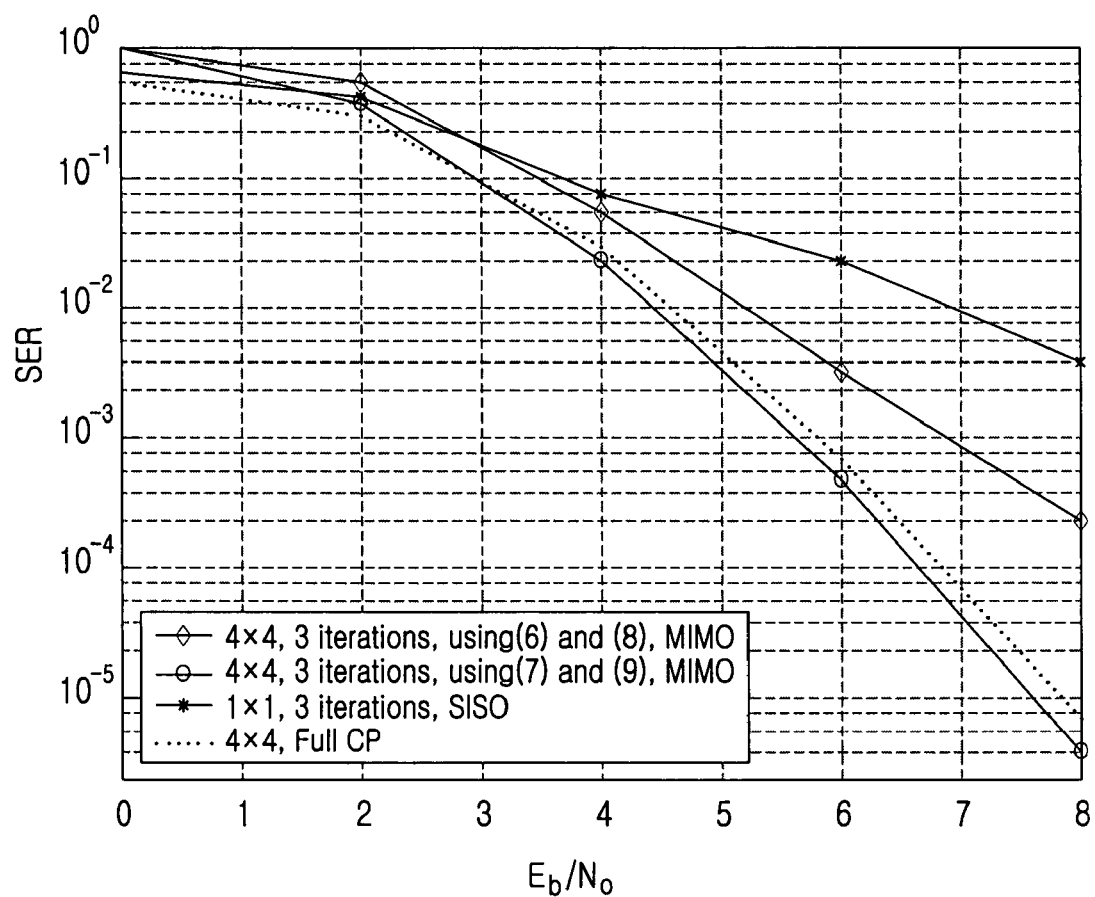
FIG. 5 is a graph illustrating a simulated Symbol Error Rate (SER) performance of the ICI cancellation method according to the present invention.

FIG. 5 is a graph illustrating a simulated SER performance of the CPR method according to the present invention. Table 1 below compares the CPR method with Per-Tone Equalization (PTEQ) in terms of complexity.

TABLE 1

| | Proposed CPR | | PTEQ (per-tone equilization) |
|---|---|---|---|
| Computing Weight Coefficients and Equivalent SINRs | $\frac{1}{4}N_a(N_a + 1)NI\{(3N + 7)N_a^3 + 6N_a^2 + (N + 2)N_a + 2\}$ | Computing Weight Coefficients | $NN_a^3\{(K^{555} + 1)^2(L + 2K - G + 3) + (L + K - G + 1)^2(2L + 3K - 2G + 3)\} + N(K + 1)^2(K + N) + N^2\{3(K + L - G + 1)^2 + N + G\}$ |
| ISI & ICI Cancellation | $\frac{1}{2}(I + 1)N_a^2(L - G)(L - G + 1)$ | | |
| Computing Channel Frequency Response | $\frac{1}{2}N_a^2 N \log_2 N$ | Computing Per-Tone Equalizer Inputs | $\frac{1}{2}N_a^2 N \log_2 N$ |
| Computing ICI channel Frequency Response | $N_a^2 N(L - G) \cdot (N + (L - G + 1)/2)$ | Computing Per-Tone Equalizer Outputs | $N_a^2 N(K + 1)$ |
| Total | 12993216† | Total | 29681792† |

The simulation is for an OFDM system with 64 subcarriers (N=64), using encoding but no CP. K is the order of a per-tone equalizer and a constraint length I is 3. Coding rate ½ convolutional coding and Quadrature Phase Shift Keying (QPSK) are used. A CIR length is 20 (L=20) and a 6-path Rayleigh fading channel model whose power is exponentially decreased is used. These channels are defined as $h_l = e^{-l/T_{rms}}/S_h$ (l=0, 4, . . . , 20). Here, $T_{rms} = 20/\sqrt{3}$ and $S_h = \Sigma_l e^{-l/T_{rms}}$ is a normalization factor.

FIG. 5 illustrates the SER of a MIMO-OFDM system with $f_D NT_s = 0.001$ where $f_D$ is a maximum Doppler frequency and $T_s$ is the sample period of an OFDM signal.

The delay span of a channel is 31.3% of an OFDM symbol period. In this case, the use of a sufficient length CP drops frequency use efficiency by 23.8%. As noted from FIG. 5, the CPR scheme proposed for the MIMO-OFDM system without a CP outperforms a system using a sufficient CP. The ratio of ICI power to signal power is 0.10 for the SISO system and 0.41 for the MIMO system.

The use of the CPR scheme using the I-MMSE and the I-CMOS brings a 1.8-dB performance increase to the MIMO-OFDM system. Also, a MIMO system using the cyclic CPR outperforms a SISO system using a CPR scheme by 3.3 dB in SER.

As described above, the present invention considerably suppresses ICI in a MIMO system with an insufficient length CP by performing CPR using an I-MMSE equalizer and I-CMOS. Therefore, the CPR-based ICI cancellation method of the present invention minimizes spectral efficiency loss caused by the use of a CP without multiplexing gain loss in a MIMO-OFDM system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A receiver for canceling Inter-Carrier Interference (ICI) in a Multiple-Input Multiple-Output (MIMO) system, comprising:
   a detection orderer for determining a subcarrier detection order according to Signal-to-Interference and Noise Ratios (SINRs) of subcarriers in an Improved-Capacity Mapping Ordering Scheme (ICMOS);
   a detector for receiving a vector on the subcarriers and a priori information from a decoder according to the subcarrier detection order and iteratively estimating the received vector using the a priori information; and
   the decoder for decoding an ICI-cancelled signal according to the estimate.

2. The receiver of claim 1, wherein the detector calculates the estimate of the received vector, which minimizes a Mean Squared Error (MSE).

3. The receiver of claim 1, further comprising:
   an Inter-Symbol Interference (ISI) canceller for canceling ISI from the received vector; and
   a cyclic reconstructor for reconstructing cyclicity of the ISI-cancelled signal and outputting a cyclicity-reconstructed signal to the detection orderer.

4. The receiver of claim 3, wherein the ISI canceller cancels the ISI from a current received signal by tail cancellation using a previous symbol value.

5. The receiver of claim 1, further comprising:
   a deinterleaver for deinterleaving a signal received from the detector; and
   an interleaver for interleaving a decoded signal received from the decoder.

6. The receiver of claim 1, wherein the detection orderer determines the subcarrier detection order to be a descending order of SINRs based on a weight vector of the detector.

7. The receiver of claim 1, wherein the detection orderer calculates equivalent SINRs and selects a layer with the highest equivalent SINR as a detection layer, by $$SINR_{equiu}^{jp} = 2^{\frac{\sum_{n=0}^{N-1} \log_2(1+SINR_{i,n}^{jp})}{N}} - 1$$

where $SINR_{i,n}^{jp}$ is the SINR of a signal transmitted on an $n^{th}$ subcarrier through a $p^{th}$ transmit antenna in an $i^{th}$ Orthogonal Frequency Division Multiplexing (OFDM) symbol period and N is the number of the subcarriers.

8. The receiver of claim 1, wherein the detector calculates the estimate using an ICI-cancelled signal and a weight vector for a selected layer.

9. The receiver of claim 8, wherein the detector calculates the estimate by $$\hat{X}_{i,n}^P = (w_{i,n}^P)^H Y_{i,n}^P$$

where $W_{i,n}^P$ and $Y_{i,n}^P$ are the weight vector and the ICI-cancelled signal for a signal transmitted on an $n^{th}$ subcarrier through a $p^{th}$ transmit antenna in an $i^{th}$ OFDM symbol period.

10. The receiver of claim 8, wherein the weight vector and the ICI-canceled signal are calculated by $$w_{i,n}^P = (H_{i,n} P_{i,n} H_{i,n}^H + \sigma_N^2 I)^{-1} h_{i,n}^P$$

where $H_{i,n}$ is a desired signal for an $n^{th}$ subcarrier in an $i^{th}$ OFDM symbol period, $h_{i,n}^P$ is a column vector of $H_{i,n}$, and I is an identity matrix, and by $$Y_{i,n}^P = \tilde{R}_{i,n} - \overline{H}_{i,n}^P \overline{X}_{i,n}^P$$

where $\tilde{R}_{i,n}$ is the received vector, $$\overline{H}_{i,n}^P.$$

is a matrix obtained by eliminating a $p^{th}$ column from $H_{i,n}$, and $$\overline{X}_{i,n}^P$$

is a vector obtained by eliminating a $p^{th}$ element from $x_{i,n}$.

11. The receiver of claim 1, wherein the detector calculates an estimate of a transmitted symbol which minimizes an MSE $$E\{|X_{i,n}^P - \hat{X}_{i,n}^P|^2\}$$

using a priori information $$\{L(X_{i,n}^P)\}_{p=1}^{M_T},$$

$X_{i,n}^P$ being a symbol sequence transmitted on an $n^{th}$ subcarrier through a $p^{th}$ transmit antenna in an $i^{th}$ OFDM symbol period, and $\hat{X}_{i,n}^P$ being an estimate of the symbol sequence.

12. The receiver of claim 1, wherein the decoder provides a priori information $$\{L(X_{i,n}^P)\}_{p=1}^{M_T} = \phi(\{L_D(c_{i,n}^P)\}_{n=0}^{N-1}).$$

that has passed through an operator $\phi$ including a random interleaver and a mapper to the detector, $\phi_{i,n}^P X_{i,n}^P$ being coded bits transmitted on an $n^{th}$ subcarrier through a $p^{th}$ transmit antenna in an $i^{th}$ OFDM symbol period.

13. A method for canceling Inter-Carrier Interference (ICI) in a Multiple-Input Multiple-Output (MIMO) system, comprising:
determining a subcarrier detection order according to Signal-to-Interference and Noise Ratios (SINRs) of subcarriers in an Improved-Capacity Mapping Ordering Scheme (I-CMOS);
receiving a vector on the subcarriers and a priori information received from a decoder according to the subcarrier detection order and iteratively estimating the received vector using the a priori information; and
decoding an ICI-cancelled signal according to the estimate.

14. The method of claim 13, further comprising:
canceling Inter-Symbol Interference (ISI) from the received vector; and
reconstructing cyclicity of the ISI-cancelled signal and outputting a cyclicity-reconstructed signal for detection ordering.

15. The method of claim 13, further comprising:
deinterleaving the estimate; and
interleaving the decoded signal.

16. The method of claim 13, wherein the determination comprises determining the subcarrier detection order to be a descending order of SINRs based on a weight vector.

17. The method of claim 13, wherein the estimation comprises calculating the estimate using an ICI-cancelled signal and a weight vector for a selected layer.

18. A method for determining a detection order to cancel Inter-Carrier Interference (ICI) in a Multiple-Input Multiple-Output (MIMO) system, comprising:
calculating an equivalent Signal-to-Interference and Noise Ratio (SINR) of each of a plurality of subcarriers for each of a plurality of layers;
ordering the calculated equivalent SINRs; and
determining the detection order according to the equivalent SINR ordering.

19. The method of claim 18, wherein the determination comprises determining the detection order to be a descending order of equivalent SINRs based on a weight vector.

20. A detection method for canceling Inter-Carrier Interference (ICI) in a Multiple-Input Multiple-Output (MIMO) system, comprising:
determining a layer detection order to be a descending order of equivalent Signal-to-Interference and Noise Ratios (SINRs) based on a weight vector;
iteratively detecting an estimate of a detected layer from which a Cyclic Prefix (CP) is removed according to the detection order so that a squared error between the estimate and a received vector in the layer is minimized; and
decoding the layer, updating the received vector, cyclically reconstructing the CP, and repeating the detection.

21. The method of claim 18, further comprising:
receiving a vector on the subcarriers and a priori information received from a decoder according to the detection order; and
iteratively estimating the received vector using the priori information.

* * * * *